United States Patent [19]

Nida

[11] 4,173,665

[45] Nov. 6, 1979

[54] METHOD OF RUSTPROOFING MOTOR VEHICLES

[76] Inventor: Roy J. Nida, 22W054 Stratford Pl., Glen Ellyn, Ill. 60137

[21] Appl. No.: 895,917

[22] Filed: Apr. 13, 1978

[51] Int. Cl.$^2$ .................. C09I 11/02; B32B 25/16; B32B 25/00; B32B 27/04

[52] U.S. Cl. .................. 427/421; 252/389 R; 252/396; 260/29.7 R; 260/29.7 M; 260/29.7 EM; 260/29.7 N; 260/29.7 E; 427/388 C; 428/462

[58] Field of Search .......... 260/29.7 R, 29.7 M, 260/29.7 EM, 29.7 N, 29.7 E; 106/14.11, 14.13, 14.14, 14.21; 252/389 R; 428/462

[56] References Cited

U.S. PATENT DOCUMENTS

| | | | |
|---|---|---|---|
| 1,967,861 | 7/1934 | Collins | 260/29.7 E |
| 2,921,858 | 1/1960 | Hall | 108/14.14 |
| 3,028,257 | 4/1962 | Svrchek et al. | 117/46 |
| 3,078,247 | 2/1963 | Sinn et al. | 260/29.7 M |
| 3,227,575 | 1/1966 | Ziebart | 117/49 |
| 3,304,348 | 2/1967 | Svrchek | 260/894 |
| 3,446,652 | 5/1969 | Smith | 117/75 |
| 3,483,148 | 12/1969 | Desmarais | 260/29.7 R |
| 3,549,391 | 12/1970 | Miller et al. | 106/14 |
| 3,582,367 | 6/1971 | Miller et al. | 106/14 |
| 3,730,937 | 5/1973 | Boggs et al. | 260/37 R |
| 3,758,432 | 9/1973 | Hopper | 260/17 R |
| 3,838,085 | 9/1974 | Myers et al. | 260/17 R |
| 3,845,212 | 10/1974 | Yovich et al. | 260/17 R |
| 3,979,549 | 9/1976 | Wilkinson | 428/450 |
| 4,049,596 | 9/1977 | Traister | 106/14.11 |
| 4,067,837 | 1/1978 | Miller | 260/29.6 M |

*Primary Examiner*—Herbert J. Lilling
*Attorney, Agent, or Firm*—Robert M. Ward

[57] ABSTRACT

An improved rustproofing composition for application to metal panels of motor vehicle bodies for prevention of rust and corrosion of same, comprising polychloroprene polymer latex solids dispersed in an aqueous medium, surface active agents, pigments, freeze point reduction agents, rheological control agents, bacteriostatic agents, pH-control agents, and corrosion inhibitors.

10 Claims, No Drawings

METHOD OF RUSTPROOFING MOTOR VEHICLES

BACKGROUND OF THE INVENTION

The present invention relates generally to corrosion inhibitors. More particularly, the present invention concerns an improved rustproofing composition for application to metal panels of motor vehicle bodies for prevention of corrosion thereof.

In the prior art, techniques have heretofore been utilized in an attempt to prevent corrosion of the internal surfaces of the metal panels of the motor vehicle bodies. One such technique is set forth in U.S. Pat. No. 3,227,575 to K. Ziebart. Therein, certan improvements on the prior art asphalic materials which have been used on the under surface of a motor vehicle are set forth. Specifically, the under surface of the automobile vehicle and the interior surface of the metal panels comprising the body of the motor vehicle are coated with an improved rustproofing composition.

Openings in the body of the automobile are formed to provide access to the otherwise relatively inaccessible hollow areas of the body. A nozzle is inserted into the openings in such relatively inaccessible hollow areas of the body and a rustproofing material is continuously provided through the nozzle to direct a spray laterally therefrom. The nozzle is inserted into the opening and is rotated about the axis of the opening to coat the entire inaccessible hollow area.

The above prior art techniques have represented improvement over the thermosetting asphaltic materials which have been used heretofore in the prior art. However, the rustproofing compounds utilized in connection with the K. Ziebart process have been found to be less than optimal in actual use.

Specifically, these prior art rustproofing compounds have been hydrocarbon based, which has resulted in a long-standing residual odor within the treated motor vehicle. Also, the hydrocarbon solvents used have caused considerable additional expense in the production of such prior art rustproofing compounds, due to prevailing governmental regulations on air pollution where hydrocarbon solvents are used in manufacturing. Furthermore, these prior art hydrocarbon based rustproofing compositions have been messy to apply, due in part to a lack of favorable rheological properties, and have required considerable clean-up, which has resulted in a time inefficient and distasteful process for the person applying the same.

SUMMARY OF THE PRESENT INVENTION

Accordingly, in view of the shortcomings of the prior art, it is an object of the present invention to provide an improved rustproofing composition which requires no hydrocarbon solvents in the manufacture of the composition thereof.

It is an additional object of the present invention to provide an improved rustproofing composition which has favorable rheological properties so as to prevent dripping.

It is a further object of the present invention to provide an improved rustproofing composition which is essentially free from any residual odor upon application.

It is also an object of the present invention to provide an improved rustproofing composition for metal panels of motor vehicle bodies having increased corrosion inhibiting properties.

These and other advantages and objects of the present invention will become apparent in view of the following specification setting forth in greater detail the preferred embodiments of the present invention.

DETAILED DESCRIPTION OF PREFERRED EMBODIMENTS

The present invention comprises an improved rustproofing composition for application to metal panels of motor vehicle bodies to prevent corrosion thereof. The improved rustproofing composition of the present invention comprises at least approximately twenty (20) percent of polychloroprene latex solids, dispersed in an aqueous medium. Polychloroprene, as used in the improved rustproofing composition of the present invention, is manufactured by the polymerization of 2-chloro-1, 3-butadiene, and is sold under the trademark "Neoprene."

The improved rustproofing composition of the present invention further comprises at least approximately one (1) percent of at least one surface active agent, such as antifoaming and/or wetting agents. Also, at least approximately twenty (20) percent of pigment solids are further included, such pigment solids being at least one of carbon black, silica and zinc oxide. Additionally, corrosion inhibitors such as sodium nitrate, sodium benzoate, and zinc chromate may preferably be utilized.

The improved rustproofing composition of the present invention is further comprised of approximately two (2) percent of a freeze point reduction agent, such as ethylene glycol, or other glycols. Yet additionally, approximately 0.15 percent of a rheological control agent, such as ethyl cellulose, may be included for providing a more viscous body to the composition, whereby dripping of the composition during application is minimized. A bacteriostatic solution in an amount of approximately 0.05 percent may be added. Also, a pH-control agent, such as ammonium hydroxide in an amount of approximately 0.02 percent may be utilized.

The following examples are given as illustrations of compositions suitable for the improved rustproofing compositions of the present invention.

EXAMPLE 1

This example illustrates the production of preferred embodiments of the improved rustproofing composition of the present invention.

| | Ingredients | Optimum Proportion (% by weight) | Approx. Useful Proportions (% by weight) |
|---|---|---|---|
| a. | Water | 1.57 | 1–3 |
| b. | Tamol-731 | 1.03 | 0.5–2 |
| c. | Triton CF-10 | 0.21 | 0.1–0.3 |
| d. | Nopco NDW Antifoam | 0.21 | 0.1–0.3 |
| e. | Ethylene Glycol | 2.10 | 1–3 |
| f. | Ethyl Cellulose (2% Sol.) | 7.99 | 5–9 |
| g. | Methasol 57 | 0.05 | .025–0.075 |
| h. | Black Paste (30% solids) | 9.48 | 7–11 |
| i. | Silica 1160 | 18.99 | 15–23 |
| j. | Zinc Oxide | 0.64 | 0.4–0.8 |
| k. | Polychloroprene Polymer Latex (46% solids) | 56.96 | 40–75 |
| l. | Tributyl Phosphate | 0.47 | 0.2–0.6 |
| m. | Nopco NDW Antifoam | 0.21 | 0.1–0.3 |

| Ingredients | Optimum Proportion (% by weight) | Approx. Useful Proportions (% by weight) |
|---|---|---|
| n. Ammonium Hydroxide 28% sol. | 0.09 | 0.05–0.15 |

Items a. through j., supra, are introduced into a vessel and ground by a high-speed disperser for 15 minutes at 3800–4500 r.p.m. The speed is reduced to 1500 r.p.m. for 5 minutes.

The above resulting dispersion is continued to be ground at 1500 r.p.m. while adding item k., the polychloroprene latex.

Items 1. and m., supra, were pre-mixed and added to the dispersion with continued grinding at 1500 r.p.m. Thereafter, grinding was discontinued for 5 minutes and then item n., ammonium hydroxide, was added.

The mixture was continued to be ground for 3 minutes, after which it was filled into containers for shipment. The resulting improved rustproofing composition had minimal odor, and was sufficiently thick in body to prevent dripping during application.

EXAMPLE 2

The procedure of EXAMPLE 1 is carried out replacing ethylene glycol with propylene glycol.

EXAMPLE 3 the procedure of EXAMPLE 1 is carried out replacing the zinc oxide with silica.

EXAMPLE 4

The procedure of EXAMPLE 1 is carried out adding one (1) percent of sodium nitrate as a corrosion inhibitor.

EXAMPLE 5

The procedure of EXAMPLE 1 is carried out using one (1) percent sodium benzoate as a corrosion inhibitor.

EXAMPLE 6

The procedure of EXAMPLE 1 is carried out using one (1) percent of zinc chromate as a corrosion inhibitor.

EXAMPLE 7

The composition as set forth in EXAMPLE 1, supra, is sprayed onto a motor vehicle metal panel and exposed to corrosive conditions. On a scale of 10 (10 being optimal), the panel is evaluated as rating a 9.

EXAMPLE 8

Compositions such as used in connection with U.S. Pat. 3,227,575 to K. Ziebart, supra, are coated on identical metal panels under identical techniques, and are exposed to the same conditions as those in EXAMPLE 7, supra. On a scale of 10 (10 being optimal), the K. Ziebart composition is rated a 4.

The improved rustproofing composition of the present invention should be utilized with adequate ventilation to avoid extended inhalation of spray therefrom. Preferably, a face mask should be utilized. Also, the improved composition of the present invention should not be stored near heating equipment or flame.

The composition should be mixed thoroughly prior to application. Preferably, the improved rustproofing composition is applied to motor vehicle surfaces by spraying, such as by the utilization of a pressurized sprayer. The product should be agitated thoroughly before transferring to the pressurized tank thereof. The preferred pressure to be utilized during spraying is between 70–75 p.s.i. Pressures in excess of that range will result in overspray, and accordingly wasted product.

For proper application, a small hole, preferably ½ inch in diameter, should be drilled in the front and rear doors, approximately 5 inches from the bottom of the door; in the front, center and rear pillars, approximately two inches above the bend at the bottom thereof; and in the rocker panels. Caution should be utilized in checking for electrical wiring during drilling in the front and rear pillars. After spraying the improved rustproofing composition of the present invention thoroughly over the above interior surfaces, each hole should be plugged.

In coating the interior surface of the motor vehicle doors, all windows must be closed during application. If radio speakers are mounted in the door, caution should be utilized in inserting the nozzle into the access opening. Although the improved rustproofing composition of the present invention will not damage power window lifts, care should be exercised in spraying around such mechanisms so that all areas will be adequately and carefully coated. It should not be necessary to spray more than half way to the top of the motor vehicle door. On station wagons, the inside panel should be removed from the tailgate for access to the entire area. As above, the area should be sprayed thoroughly with the window glass in closed position.

The interior of the pillars and rocker panels are sprayed thoroughly through access holes, until such areas are thoroughly coated. In coating the motor vehicle trunk, the carpet thereof should be removed and the area should be sprayed along the bottom seam between the rear wheel housing and the rear quarter panel. All other seam areas should be sprayed under the carpet. Spraying directly on the tail lights should be avoided, although the area immediately surrounding the tail lights should be coated. The protective panel at the rear of the trunk should be removed and sprayed thoroughly. The deck lid should be sprayed through existing holes to coat the seam areas along the trailing edge thereof.

In order to coat the interior surface of the fenders, the car should be placed on a hoist, and the wheels may be removed for better access to fender wells. If the lower area of the rear quarter panel has not been sprayed through the trunk opening, it may now be reached from underneath. If the area is enclosed, an access plug can be removed to allow entrance to the boxed section. If a fender is double walled, two holes should be drilled therein, and the nozzle inserted so that the area may be sprayed thoroughly. Also, the nozzle should be inserted through the lower hinge openings through the fender walls for spraying therein. It is important to locate the hole in the fender brace directly in front of the door located, and spray thoroughly inside to protect the fender area behind the brace. The front door should be open and sprayed to coat the upper section sufficiently.

In coating the under surface of the hood, the leading edge of the hood should be sprayed through existing holes, if it is double walled. If welded seaming exists, it should be thoroughly sprayed. The battery should be removed and the spray support pan thoroughly sprayed. The headlight area should likewise be thoroughly sprayed, as should the front quarter panel and wheel wells.

In coating the under side of the motor vehicle, the entire underside of the motor vehicle, except for the frame, oil pan, steering linkage, transmission, differential, exhaust system, drive shaft, and brake drums should be coated, and special attention should be given to welded joints and seams thereof.

In addition to the above general procedures, however, certain manufactures of motor vehicles may require additional spraying in order to assure that each of the interior areas thereof has been coated with the improved rustproofing composition of the present invention.

The above examples are meant to be illustrative of physical embodiments of the present invention and no limitations are intended thereby. These compositions may, of course, be modified in accordance with the principles and purposes of the present invention.

Other modifications, substitutions and alternatives will be readily apparent upon a review of the present disclosure, and are intended to be included within the scope of the present invention.

What is claimed is:

1. An improved method of rustproofing a motor vehicle comprising:
    applying a rustproofing composition to the metal panels of the motor vehicle bodies for preventing corrosion of same,
    said improved rustproofing composition comprising a substantially uniform dispersion of:
    at least approximately twenty (20) percent polychloroprene polymer latex solids dispersed in an aqueous medium;
    at least approximately one (1) percent of at least one surface active agent selected from the group of antifoam and wetting agents; and
    at least approximately twenty (20) percent of pigment solids.

2. The improved rustproofing method of claim 1 wherein said rustproofing composition further includes approximately two (2) percent of a freeze point reduction agent.

3. The improved rustprooffing method of claim 2 wherein said freeze point reduction agent is selected from the group consisting of ethylene glycol and propylene glycol.

4. The improved rustproofing method of claim 1 wherein said rustproofing composition further includes approximately 0.15 percent of rheological control agent solids.

5. The improved rustproofing composition of claim 4 wherein said rheological control agent solids comprise ethyl cellulose.

6. The improved rustproofing method of claim 1 wherein said rustproofing composition further includes approximately 0.05 percent of a bacteriostatic agent solution.

7. The improved rustproofing method of claim 1 wherein said rustproofing composition further includes approximately 0.02 percent of a pH control agent.

8. The improved rustproofing composition of claim 7 wherein said pH control agent is ammonium hydroxide.

9. The improved rustproofing method of claim 1 wherein said pigment solids are at least one of carbon black, silica, and zinc oxide.

10. The improved rustproofing method of claim 1 further including at least one (1) percent of a corrosion inhibitor selected from the group consisting of sodium nitrate, sodium benzoate and zinc chromate.

* * * * *